June 5, 1934.  E. H. HORSTKOTTE  1,961,764
FILM MICROMETER
Filed Jan. 12, 1933
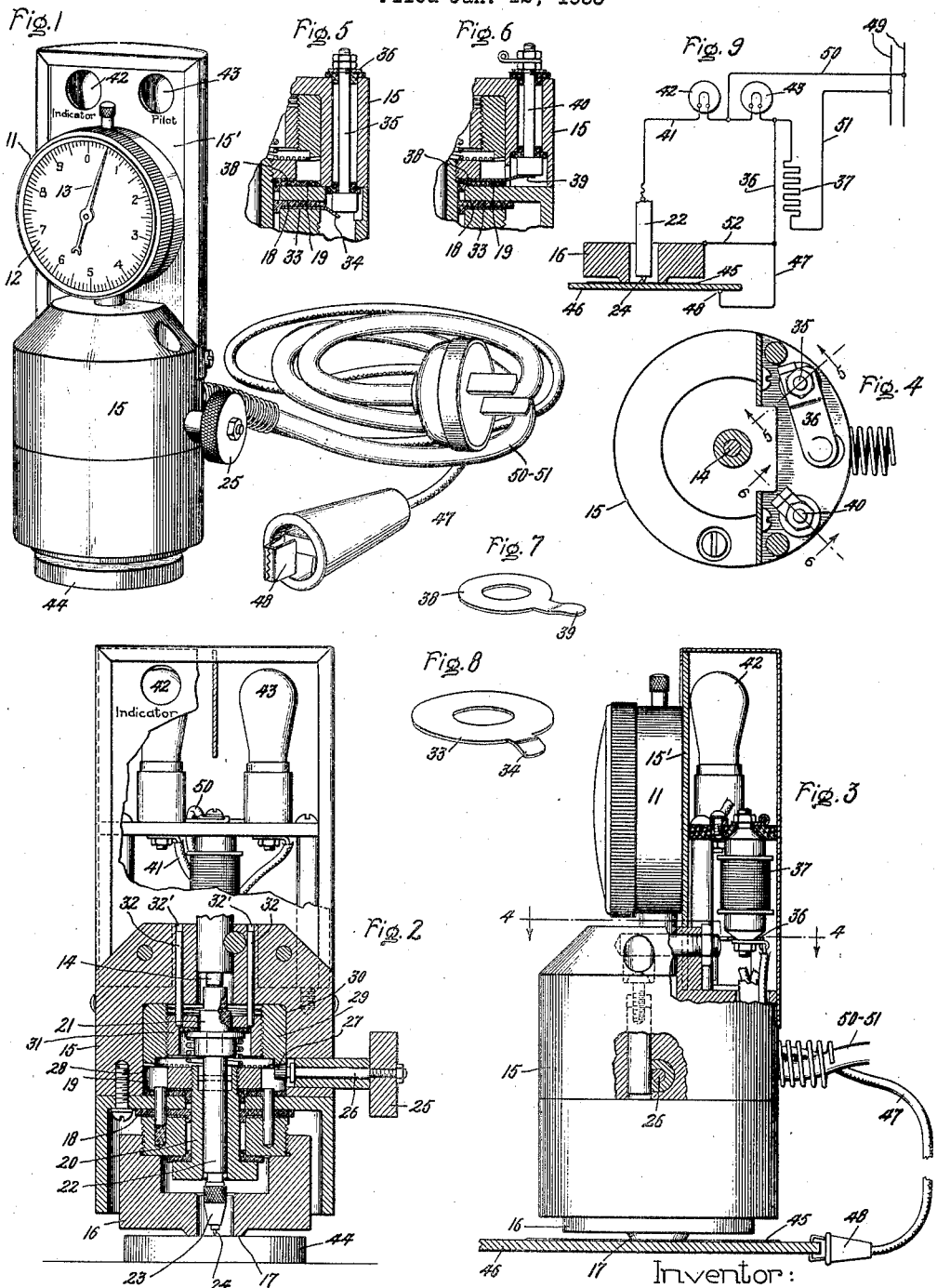
Inventor:
Edward H. Horstkotte,
by Charles E. Tillar
His Attorney.

Patented June 5, 1934

1,961,764

UNITED STATES PATENT OFFICE 1,961,764

FILM MICROMETER

Edward H. Horstkotte, Erie, Pa., assignor to General Electric Company, a corporation of New York Application January 12, 1933, Serial No. 651,323

5 Claims. (Cl. 33—172)

My invention relates to devices for measuring linear distances and concerns particularly precision devices for measuring relatively short distances. One of the primary objects of my invention is to provide an apparatus for measuring the thickness of lacquer films or other relatively thin coatings. Other and further objects will become apparent as the description proceeds.

In accordance with my invention in its preferred form an extensometer which may be of conventional type is mounted upon a device provided with a foot adapted to be placed in contact with the surface of a film, the thickness of which is to be measured. A sharp pointed steel pin is attached to the movable element of the extensometer and arranged so that it may be pressed through the film. The pin and the object coated with the film to be measured form a portion of an electrical circuit so that when the film has been pierced, the circuit is closed between the point and the coated object and the operator is given a signal indicating that the movable element of the extensometer has travelled the distance corresponding to the thickness of the film being measured. Readings are obtained from the dial of the extensometer in the conventional manner.

The features of my invention which I believe to be novel and patentable will be pointed out in the claims appended hereto. A better understanding of my invention itself, however, may be obtained by referring to the following description taken in connection with the accompanying drawing in which Fig. 1 is a view in perspective of one embodiment of my invention; Fig. 2 is a front elevation partially in cross-section of the arrangement shown in Fig. 1; Fig. 3 is a side elevation partially in cross-section of the same arrangement; Fig. 4 is a section seen from above cut by the offset horizontal planes 4—4 indicated in Fig. 3; Figs. 5 and 6 are sections cut by the planes 5—5 and 6—6 respectively, shown in Fig. 4; Figs. 7 and 8 are perspective views of conducting elements used in the construction of the apparatus; and Fig. 9 is a schematic diagram showing the electrical circuit used in the apparatus shown in Fig. 1.

Referring now more in detail to the drawing in which like reference characters refer to like parts throughout, in the illustrated form of my invention I may utilize an extensometer 11 of conventional type having a dial 12 and a pointer 13 which deflects in response to longitudinal movement of a rod 14. However, it will be understood that I am not limited to any particular form of extensometer, and by the term "extensometer" as used in this description and in the claims hereinafter, I mean to include any type of measuring unit in which moving a movable element produces deflection of a pointer or any other indication from which a measurement of length may be obtained. Since the extensometer itself forms no part of my invention and suitable means for communicating the motion of the rod 14 to the pointer 13 are well known in the art, this part of the apparatus is not described in detail.

The extensometer 11 is mounted on a plate 15' attached to a gear housing 15. There is attached to the housing 15 a member 16 having a projecting portion 17 machined to a substantially plane surface to form a foot. The foot 17 serves to determine the relative position between the extensometer 11 and the surface from which a measurement is to be made. The member 16 is electrically insulated from the housing 15 and a sleeve 20 by means of insulating bushings 18 and 19. The movable rod 14 of the extensometer 11 is mechanically connected by means of an insulating coupling 21 to a rod 22 sliding in sleeve 20 and carrying a head 23 by means of which a sharply pointed steel pin 24 may be attached removably, if desired, to the rod 22.

Longitudinal motion of the relatively sharp point 24 may be produced by rotating the knurled wheel 25 keyed to a shaft 26 carrying a bevel gear 27 meshing with beveled teeth 28 cut on the lower edge of a hollow cylinder 29. The hollow cylinder 29 revolves in a cylindrical recess 30 in the housing 15. The inner surface of the hollow cylinder 29 is threaded to engage the outer threaded surface of a cylindrical member 31 fastened to the insulating coupling 21, which in turn is attached to the movable rod 14 of the extensometer 11 and connected to the piercing point 24 by rod 22. Pins 32 attached to the threaded member 31 slide in holes 32' to permit the threaded member 31 to move axially in response to rotation of knurled wheel 25 and threaded cylinder 29 without permitting the member 31 to turn.

An electrical connection is formed from member 16 through a conducting washer 33, lug 34 of washer 33, bolt 35 (Fig. 5), and conducting strip 36, to the lower terminal of resistor 37 (Fig. 3). Likewise, an electrical connection is formed from piercing point 24 through head 23, rod 22, sleeve 20, conducting washer 38, lug 39 of washer 38, bolt 40 (Fig. 6), and lead 41 (shown schematically in Fig. 9), to one terminal of an indicator lamp 42.

In addition to the indicator lamp 42 one may also, if desired, use a pilot lamp 43 to guard against attempting to obtain an indication when for any reason there is an interruption of the source of current to the apparatus. Both lamps may be either of the incandescent filament or gaseous discharge type, such as neon tubes, for example. However, it will be understood that I am not limited to the use of electric lamps as my invention obviously includes the use of any electrical device which gives an indication or response when energized.

Any plane surface of a metallic object may be used in order to obtain the zero reading of the device, but for convenience I may provide a small plate 44 with plane surfaces for this purpose, as shown in Figs. 1 and 2. In Figs. 3 and 9 the apparatus is represented in position for measuring the thickness of a relatively non-conducting film 45 of lacquer or other material on the surface of an object 46 of metal or other conducting material. A flexible lead 47 carrying a clip 48 is provided in order to complete a circuit from the indicator lamp 42 through the coated object 46.

Referring to Fig. 9 when the apparatus is in position for making a measurement and the point 24 has been pressed through the film 45, an electrical circuit is formed from one terminal of source of current 49 through conductor 50, indicator lamp 42, conductor 41, rod 22, piercing point 24, object 46, clip 48, conductors 47 and 36, resistor 37, and conductor 51, back to the other terminal of source 49.

When the apparatus is being adjusted for zero position and point 24 is in the plane of foot 17, the electrical circuit is completed from point 24 through plate 44, member 16 and conductor 52, instead of through object 46, clip 48 and conductor 47.

A parallel circuit is formed from one terminal of source 49 through conductor 50, pilot lamp 43, resistor 37, and conductor 51, back to the other terminal of source 49. The latter circuit is closed and the lamp 43 is continuously energized as long as leads 50 and 51 are connected to the source 49.

In using the device, it is first placed with its plane surfaced rest or foot 17 in contact with the plane surface of a flat plate 44. The point 24 is then caused to descend by revolving knurled head 25 until electrical circuit through lamp 42 is closed, through point 24, plate 44 and member 16, so that the indicator lamp 42 lights up. The position of the pointer 13 on dial 12 is then noted or, if desired, the pointer may be set to zero by turning the dial 12 of the extensometer. The apparatus is now so adjusted that the pointer 24 lies in the plane of the foot 17. The apparatus is then placed with the foot 17 in contact with the surface of the film 45 of lacquer, enamel, or other material coating the object 46. The clip 48 is fastened to the object 46 and the knurled head 25 is rotated until the indicator lamp 42 lights up again, thus indicating that the sharpened point 24 has pierced the film 45 and made contact with the object 46. The reading of the pointer 13 then indicates the thickness of the film.

The pilot lamp 43 burns whenever the apparatus is connected to a source of current and failure of the pilot lamp 43 to be illuminated indicates either that the apparatus is disconnected or a failure of power, so that the operator will be assured whenever pilot lamp 43 is burning that the failure of indicating lamp 42 to light indicates that the sharpened point 24 has not yet made contact.

Although my apparatus is particularly advantageous for use in measuring the thickness of films coating metal, it will be understood that it may also be used to measure other linear distances such as the depth of holes in metallic parts or the distances between any two metallic surfaces. In such case, the projecting rest or foot 17 is placed against one of the surfaces and the point 24 is adjusted by means of the knurled knob 25 until contact is made between the second surface and the point 24. The adjustment of point 24 in coincidence with the plane of the foot 17 is made by using the flat plate 44, as previously described.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A device for measuring the thickness of a relatively non-conducting film upon the surface of an object composed of conducting material comprising in combination with a source of current, an extensometer having a movable member, a movable piercing point mechanically connected to the movable member of said extensometer, a supporting member for said extensometer having a collar surrounding said piercing point and adapted to abut the surface of the film, the thickness of which is to be measured, and serving to determine the position of said extensometer with respect to said surface, said point and said collar being electrically insulated from each other, means for causing said point to travel relative to said collar piercing said film from an initial position in contact with the surface thereof, an electrical signal connected in series with said source of current in a circuit having terminals electrically connectable to said piercing point and the object coated with said film, thereby causing said signal to be energized when said point comes into electrical contact with the material under said film and providing an indication that the movable member of said extensometer has traversed the thickness of said film.

2. A device for measuring the thickness of a relatively non-conducting film upon the surface of an object of conducting material comprising in combination a foot having a substantially plane surface adapted to be placed in contact with the surface of said film, a longitudinally movable sharply pointed pin perpendicular to said plane surface of said foot and adjustable to permit bringing its point into said plane, an extensometer supported by said foot and having a movable member mechanically connected to said movable pin and an indicator responsive to the movement of said movable member, means for moving said pin along its axis relative to the plane surface of said foot causing the point of said pin to pierce said film, and an electrical circuit containing an electrical signal and having terminals electrically connectable to said pin and to the object coated with said film so that said circuit is closed and said signal is energized when said point comes in electrical contact with the object coated with said film, thereby indicating that the movable element of said extensometer has moved a distance corresponding to the thickness of said film and that the thickness thereof may be read from said extensometer indicator.

3. A device for measuring the thickness of a relatively non-conducting film upon the surface of an object of conducting material comprising in combination an extensometer having a movable member, a longitudinally movable pin having a pointed end and mechanically connected to the movable member of said extensometer, a supporting member for said extensometer having a projecting portion adjacent said movable pin and adapted to abut the surface of the film, the thickness of which is to be measured, and serving to determine the position of said extensometer with respect to said surface, said pointed pin and the projecting portion of said supporting member being electrically insulated from each other and the point of said pin normally lying in the plane of said projecting portion, means for causing said pin to travel longitudinally relative to said extensometer supporting member permitting the point of said pin to pierce said film, and means for producing a signal when said point comes into electrical contact with the material under said film, thereby providing an indication that the movable member of said extensometer has travelled a distance equal to the thickness of said film.

4. A film micrometer comprising a foot having a substantially plane surface adapted to be placed in mechanical contact with the surface of a film, the thickness of which is to be measured, a longitudinally movable sharply pointed pin having an axis perpendicular to said plane surface of said foot and adjustable in longitudinal position to permit causing its point to lie in said plane, an extensometer supported by said foot and having a movable member mechanically connected to said movable pin and an indicator responsive to the movement of said movable member, means for moving said pin with respect to said foot along the axis of said pin causing its point to pierce said film, and an electrical circuit containing a signal and arranged to be closed so as to energize said signal when said point comes in electrical contact with a material supporting said film, thereby indicating that the movable element of said extensometer has moved a distance corresponding to the thickness of said film and that the thickness thereof may be read from said extensometer indicator.

5. A film micrometer comprising a foot having a substantially plane surface adapted to be placed in mechanical contact with the surface of a film, the thickness of which is to be measured, and a longitudinally movable sharply pointed pin having an axis perpendicular to said plane surface of said foot and adjustable in longitudinal position to permit causing its point to lie in said plane, means for indicating the distance traversed by said point, means for moving said pin along its axis with respect to said foot, causing the point of said pin to pierce said film, and an electrical circuit containing a signal and arranged to be closed so as to energize said signal when said point comes into electrical contact with a material supporting said film, thereby indicating that said point has moved a distance corresponding to the thickness of said film.

EDWARD H. HORSTKOTTE.